United States Patent
Zenitani et al.

(10) Patent No.: US 9,896,771 B2
(45) Date of Patent: *Feb. 20, 2018

(54) DEHYDROGENATION DEVICE

(71) Applicant: Panasonic Intellectual Property Management Co., Ltd., Osaka (JP)

(72) Inventors: Yuji Zenitani, Nara (JP); Takashi Nishihara, Osaka (JP); Tetsuya Asano, Kyoto (JP); Akihiro Itou, Kyoto (JP); Hiroki Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 404 days.

This patent is subject to a terminal disclaimer.

(21) Appl. No.: 14/606,972

(22) Filed: Jan. 27, 2015

(65) Prior Publication Data

US 2015/0225859 A1    Aug. 13, 2015

(30) Foreign Application Priority Data

Feb. 7, 2014   (JP) ................. 2014-022708

(51) Int. Cl.
*C25B 1/02* (2006.01)
*C25B 9/08* (2006.01)
(Continued)

(52) U.S. Cl.
CPC ............ *C25B 1/02* (2013.01); *C25B 9/08* (2013.01); *C25B 13/04* (2013.01); *C01B 3/505* (2013.01)

(58) Field of Classification Search
CPC .............. C25B 1/02; C25B 9/08; C25B 13/04
See application file for complete search history.

(56) References Cited

U.S. PATENT DOCUMENTS 7,141,327 B2   11/2006   Taniguchi
7,235,171 B2    6/2007   Taniguchi
(Continued)

FOREIGN PATENT DOCUMENTS

JP   2000-302550       10/2000
JP   2003-045449 A      2/2003
(Continued)

OTHER PUBLICATIONS

Yamazaki et al. "Cation non-stoichiometry in yttrium-doped barium zirconate: phase behavior microstructure, and proton conductivity," J. Mater. Chem., 2010, 20, 8158-8166.*

(Continued)

*Primary Examiner* — Nicholas A Smith
(74) *Attorney, Agent, or Firm* — McDermott Will & Emery LLP (57) ABSTRACT

An exemplary dehydrogenation device for generating a hydrogen gas through dehydrogenation according to the present disclosure comprises an anode containing a dehydrogenation catalyst, a cathode containing catalyst capable of reducing protons, and a proton conductor disposed between the anode and the cathode. The proton conductor has a perovskite crystal structure expressed by the compositional formula $A_a B_{1-x} B'_x O_{3-\delta}$. The A element is an alkaline-earth metal and is contained in a range of $0.4 < a < 0.9$, where the a value represents a mole fraction of this element, and the B' element is a trivalent group 3 or group 13 element and is contained in a range of $0.2 < x < 0.6$, where the x value represents a mole fraction of this element.

16 Claims, 3 Drawing Sheets

(51) Int. Cl.
*C25B 13/04* (2006.01)
*C01B 3/50* (2006.01)

(56) References Cited

U.S. PATENT DOCUMENTS

| | | | |
|---|---|---|---|
| 9,437,343 | B2 | 9/2016 | Zenitani et al. |
| 9,458,544 | B2 * | 10/2016 | Zenitani .................. C25B 9/08 |
| 9,466,852 | B2 * | 10/2016 | Komori .................. H01B 1/122 |
| 9,514,855 | B2 | 12/2016 | Zenitani et al. |
| 2003/0124403 | A1 | 7/2003 | Taniguchi |
| 2008/0032140 | A1 * | 2/2008 | Elangovan ........... B01D 53/228 428/446 |
| 2010/0196767 | A1 | 8/2010 | Sala et al. |
| 2015/0037694 | A1 * | 2/2015 | Lee ..................... H01M 8/1246 429/408 |
| 2015/0225862 | A1 | 8/2015 | Zenitani et al. |
| 2016/0003767 | A1 | 1/2016 | Takeuchi et al. |

FOREIGN PATENT DOCUMENTS

| | | |
|---|---|---|
| JP | 2003-166972 A | 6/2003 |
| JP | 2007-026946 A | 2/2007 |
| JP | 2007-048569 A | 2/2007 |
| JP | 2008-023404 | 2/2008 |
| JP | 2008-518387 | 5/2008 |
| JP | 2008-130514 | 6/2008 |
| JP | 2009-110965 A | 5/2009 |
| JP | 2009-231075 | 10/2009 |
| WO | 2006/036606 | 4/2006 |
| WO | 2008/062278 | 5/2008 |

OTHER PUBLICATIONS

Daniele Pergolesi et al., "High proton conduction in grain-boundary-free yttrium-doped barium zirconate films grown by pulsed laser deposition" Nature Materials,vol. 9,2010,pp. 846-852.

Guilin Ma et al., "Ionic conduction and nonstoichiometry in Ba x Ce 0.90 Y 0.10 O3-a" Solid State Ionics 110(1998), pp. 103-110.

Non-Final Office Action issued in U.S. Appl. No. 14/731,696, dated Jan. 17, 2017.

Final Office Action issued in U.S. Appl. No. 14/731,696, dated Jul. 26, 2017.

Non-Final Office Action issued in U.S. Appl. No. 14/604,882, dated Mar. 31, 2016.

Notice of Allowance issued in U.S. Appl. No. 14/604,882, dated Jul. 20, 2016.

The Extended European Search Report dated Nov. 13, 2015 for the related European Patent Application No. 15171761.8.

Osaka T et al: "Local structure and thermal study of ytterbium-doped SrZrO3", Materials Research Bulletin, Elsevier, Kidlington, GB, vol. 34, No. 1, Jan. 1, 1999 (Jan. 1, 1999), pp. 11-24.

Peng-Nian Huang et al: "Electrical conduction of yttrium-doped strontium zirconate", Journal of Materials Chemistry, vol. 5, No. 1, Jan. 1, 1995 (Jan. 1, 1995), pp. 53-56.

Yoshihiro Yamazaki et al: "High Total Proton Conductivity in Large-Grained Yttrium-Doped Barium Zirconate", Chemistry of Materials, vol. 21, No. 13, Jul. 14, 2009 (Jul. 14, 2009), pp. 2755-2762.

* cited by examiner

DEHYDROGENATION DEVICE

BACKGROUND

1. Technical Field

The present disclosure relates to a dehydrogenation device. In particular, the present disclosure relates to a dehydrogenation device comprising a proton conductor.

2. Description of the Related Art

Among proton conducting solid electrolytes, many perovskite proton conducting oxides have been reported which are expressed by the compositional formula $AB_{1-x}B'_xO_{3-\delta}$. Herein, A is an alkaline-earth metal; B is a tetravalent group 4 transition metal element, or Ce, which is a tetravalent lanthanoid element; B' is a trivalent group 3 or group 13 element; and O is oxygen. x is a mole fraction of the B' element with which the B element is substituted, satisfying $0<x<1.0$. $\delta$ is a value representing oxygen deficiencies or oxygen excesses. The fundamental construction of a perovskite structure will later be briefly described with reference to the drawings.

Nature materials Vol 9 (October 2010) 846-852 discloses oxides of a perovskite structure. The oxides described in Nature materials Vol 9 (October 2010) 846-852 have the compositional formula $BaZr_{1-x}Y_xO_{3-\delta}$ or the compositional formula $BaCe_{1-x}Y_xO_{3-\delta}$. In these oxides, A is barium (Ba); B is Zr or Ce; and B' is Y.

Japanese Laid-Open Patent Publication No. 2008-23404 discloses a proton conducting film of a perovskite structure. The proton conducting film described in Japanese Laid-Open Patent Publication No. 2008-23404 has the chemical formula $AL_{1-x}M_xO_{3-\alpha}$. A is an alkaline-earth metal. L is one or more kinds of elements selected from cerium, titanium, zirconium, and hafnium. M is one or more kinds of elements selected from neodymium, gallium, aluminum, yttrium, indium, ytterbium, scandium, gadolinium, samarium, and praseodymium. Herein, X is the mole fraction of an M element with which the L element is substituted, where a is an atomic ratio of oxygen deficiencies. In the proton conducting film described in Japanese Laid-Open Patent Publication No. 2008-23404, $0.05<X<0.35$, and $0.15<\alpha<1.00$.

A solid polymer membrane having proton conductivity is also known. Japanese Patent Publication No. 4789949 discloses obtaining a hydrogen-rich gas from a reformed gas using such a solid polymer membrane. A hydrogen gas draws an attention as a fuel of a fuel cell and as a clean energy source.

In addition, known is a technique in which hydrogen is stored and transported in the form of an organic hydride through hydrogenation of an aromatic hydrocarbon compound. Hydrogen is picked up from the organic hydride through dehydrogenation of the organic hydride. As just described, the dehydrogenation technique of the organic hydride has been researched.

SUMMARY

The present disclosure provides a practical dehydrogenation device.

In one general aspect, a dehydrogenation device for generating a hydrogen gas through dehydrogenation disclosed herein comprises an anode including a dehydrogenation catalyst, a cathode including a catalyst capable of reducing protons, and a proton conductor disposed between the anode and the cathode, wherein the proton conductor has a perovskite crystal structure expressed by the compositional formula $A_aB_{1-x}B'_xO_{3-\delta}$, where A is at least one selected from among alkaline-earth metals; B is a tetravalent group 4 transition metal or Ce; and B' is a trivalent group 3 or group 13 element, where $0.4<a<0.9$ and $0.2<x<0.6$ are satisfied.

According to a non-limiting, illustrative embodiment of present disclosure, a practical dehydrogenation device is provided.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION OF THE EMBODIMENTS (Organic Hydride)

Benzene, toluene, biphenyl, naphthalene, 1-methylnaphthalene, and 2-ethylnaphthalene, which are aromatic hydrocarbon compounds, are hydrogenated to give cyclohexane, methyl cyclohexane, bicyclohexyl, decalin, 1-methyl-decalin, and 2-ethyl-decalin, respectively. By using such an aromatic hydrocarbon compound (e.g., benzene), hydrogen is stored in the form of a hydride (e.g., cyclohexane). In addition, acetone is hydrogenated to give 2-propanol. Accordingly, it is possible to store hydrogen in the form of 2-propanol using acetone. In the present specification, a hydride (e.g. cyclohexane or 2-propanol) given through hydrogenation of the above-exemplified organic compounds such as benzene or acetone is referred to as an organic hydride.

(Dehydrogenation of Organic Hydride)

As a dehydrogenation method of an organic hydride, a method using a hydrogen permeable membrane such as a palladium membrane which has hydrogen penetrate selectively therethrough has been known. A catalyst for dehydrogenating a supplied compound having hydrogen such as an organic hydride is formed on the front surface of the hydrogen permeable membrane. When an organic hydride is supplied from the front surface of the hydrogen permeable membrane, hydrogen is extracted on the back surface thereof. A catalyst for generating hydrogen may be formed on the back surface thereof.

In a process of the dehydrogenation, a pressure difference is given between the organic hydride supply side and the hydrogen generation side. In other words, when the pressure in the organic hydride supply side is higher than that of the hydrogen generation side, the dehydrogenation of the organic hydride occurs.

Since the dehydrogenation of the organic hydride is an endothermic reaction, a device for dehydrogenating the organic hydride has to be heated to approximately 350 degrees Celsius. For this reason, aromatic hydrocarbon which has been generated through the dehydrogenation may be deformed. As a result, a precipitate composed of carbon may be formed on the catalyst. When the precipitate composed of carbon is formed on the catalyst, the performance of the catalyst is lowered. In addition, as mentioned above, in the dehydrogenation method in which a space to which the organic hydride is supplied is separated by the hydrogen permeable membrane from a space in which hydrogen is generated to control the pressures in these two spaces, there is a problem that the hydrogen generation amount is varied due to the pressure difference. For this reason, it is difficult to control the hydrogen generation amount accurately.

The present inventors considered the dehydrogenation of the organic hydride using a proton conductive solid electrolyte. By using the solid electrolyte having proton conductivity, protons ($H^+$) are transferred through the electrolyte electrochemically. In the technique disclosed in Japanese Patent Publication No. 4789949, protons are transferred from one vessel to another vessel, both of which are separated from each other by a partition wall. Such a device is referred to as a hydrogen pump.

Hereinafter, the hydrogen pump is briefly described. A conventional hydrogen pump comprises an anode, a cathode, and a proton conductive solid electrolyte interposed therebetween. The conventional hydrogen pump have a structure in which a flow path disposed in the anode side and a flow path disposed in the cathode side are separated from each other by the electrolyte. For example, the anode including a catalyst capable of oxidizing hydrogen is formed on the front surface of the proton conductive solid electrolyte, and the cathode including a catalyst capable of reducing protons is formed on the back surface of the proton conductive solid electrolyte. In such a structure, by supplying a gas containing hydrogen to the anode-side flow path and applying a voltage difference between the anode and the cathode, a hydrogen gas is obtained in the cathode-side flow path.

In the hydrogen pump, protons withdrawn on the anode from the gas containing hydrogen are transferred through the proton conductive solid electrolyte and reduced to hydrogen on the cathode. In this way, a hydrogen gas is generated in the cathode-side flow path. In a case where a catalyst capable of dehydrogenating the organic hydride is used instead of the catalyst capable of oxidizing hydrogen, it is expected that a hydrogen gas is generated in the cathode-side flow path by supplying the organic hydride to the anode.

However, the operation condition of the hydrogen pump is affected by a temperature required for the proton conductive solid electrolyte to exert its proton conductivity. For example, when the solid polymer membrane is used as a proton conductive solid electrolyte as described in Japanese Patent Publication No. 4789949, the hydrogen pump has to be operated under a lower temperature than approximately 100 degrees Celsius which is the upper temperature limit of the solid polymer membrane. For this reason, a catalyst having a high activity even under a temperature of approximately 100 degrees Celsius is needed.

In addition, in the operation of the hydrogen pump, in order to maintain the proton conductivity, the proton conductive solid polymer membrane should be maintained under a wet condition. For this reason, the hydrogen gas generated on the cathode side includes water, and it is difficult to extract pure hydrogen. Furthermore, since the solid polymer membrane may be dissolved in the organic hydride and/or in the dehydrogenated aromatic hydrocarbon compound, it is difficult to generate hydrogen stably.

As another electrolyte having proton conductivity, a perovskite proton conducting oxide has been known. However, generally, the perovskite proton conducting oxide exhibits practical proton conductivity under a temperature of not less than 600 degrees Celsius. For this reason, when the perovskite proton conducting oxide is used as a proton conductive solid electrolyte, the perovskite proton conducting oxide has to be maintained under a temperature of not less than 600 degrees Celsius. In such a device, a heater is necessary, and the range of the choice of the elements which constitute the device for obtaining a leaky hydrogen gas is narrowed. In addition, the organic hydride and/or dehydrogenated aromatic hydrocarbon compound may be deformed due to a high temperature.

For the above reason, a practical dehydrogenation device operable in the temperature range of not less than 100 degrees Celsius and not more than 300 degrees Celsius has been required.

As a result of earnest studies, the present inventors found a proton conducting oxide capable of maintaining high proton conductivity even in the temperature range of not less than 100 degrees Celsius and not more than 500 degrees Celsius and provided a dehydrogenation device comprising the proton conducting oxide as an electrolyte.

One general aspect of the present invention will be described below.

In one general aspect, a practical dehydrogenation device for generating a hydrogen gas through dehydrogenation disclosed herein comprises an anode including a dehydrogenation catalyst, a cathode including a catalyst capable of reducing protons, and a proton conductor disposed between the anode and the cathode, wherein the proton conductor has a perovskite crystal structure expressed by the compositional formula $A_a B_{1-x} B'_x O_{3-\delta}$, where A is at least one selected from among alkaline-earth metals; B is a tetravalent group 4 transition metal or Ce; and B' is a trivalent group 3 or group 13 element, where $0.4 < a < 0.9$ and $0.2 < x < 0.6$ are satisfied.

A may be at least one selected from among Ba and Sr. B may be Zr. B' may be Y or In.

The value of a may be more than 0.4 and less than 0.8. The value of x may be more than 0.3 and less than 0.6.

The value of a may be more than 0.4 and less than 0.8. The value of x may be more than 0.4 and less than 0.6.

The value of a may be more than 0.4 and less than 0.6. The value of x may be more than 0.4 and less than 0.6.

The value of a may be more than 0.4 and less than 0.5. The value of x may be more than 0.4 and less than 0.6.

An activation energy of proton conduction of the proton conductor in a temperature range of not less than 100 degrees Celsius and not more than 500 degrees Celsius may be 0.1 eV or less.

The relationship $0.21 \leq x \leq 0.58$, $a \geq 0.054x + 0.441$, and $a \leq -0.027x + 0.886$ may be satisfied.

The proton conductor may be composed of a single phase which substantially uniform in composition and crystal structure.

The dehydrogenation catalyst may be a metal including at least one selected from the group consisting of Ni, Pt, Pd, and an alloy thereof.

The dehydrogenation catalyst may be an oxide including at least one selected from the group consisting of Ni, Pt, and Pd.

The anode may include a support. The support may be formed of $Al_2O_3$, $SiO_2$, or $ZrO_2$. The dehydrogenation catalyst may be a metal including at least one selected from the group consisting of Ni, Pt, Pd, and an alloy thereof. The dehydrogenation catalyst may be supported on the surface of the support.

The catalyst capable of reducing protons may be a metal including at one selected from the group consisting of Ni, Pt, Re, Rh, and an alloy thereof.

The catalyst capable of reducing protons may be an oxide including at least one selected from the group consisting of Ni, Pt, Re, and Rh.

The catalyst capable of reducing protons may be a cermet containing an oxide including at least one selected from the group consisting of Ni, Pt, Re, and Rh.

Before the embodiments of the dehydrogenation device according to the present disclosure are described, the proton conducting oxide used for the dehydrogenation device will be described. The proton conducting oxide described below is a perovskite proton conductor having a perovskite structure. The proton conducting oxide has high proton conductivity even in the temperature range of not less than 100 degrees Celsius and not more than 500 degrees Celsius.

(Perovskite Structure)

Figure 1:
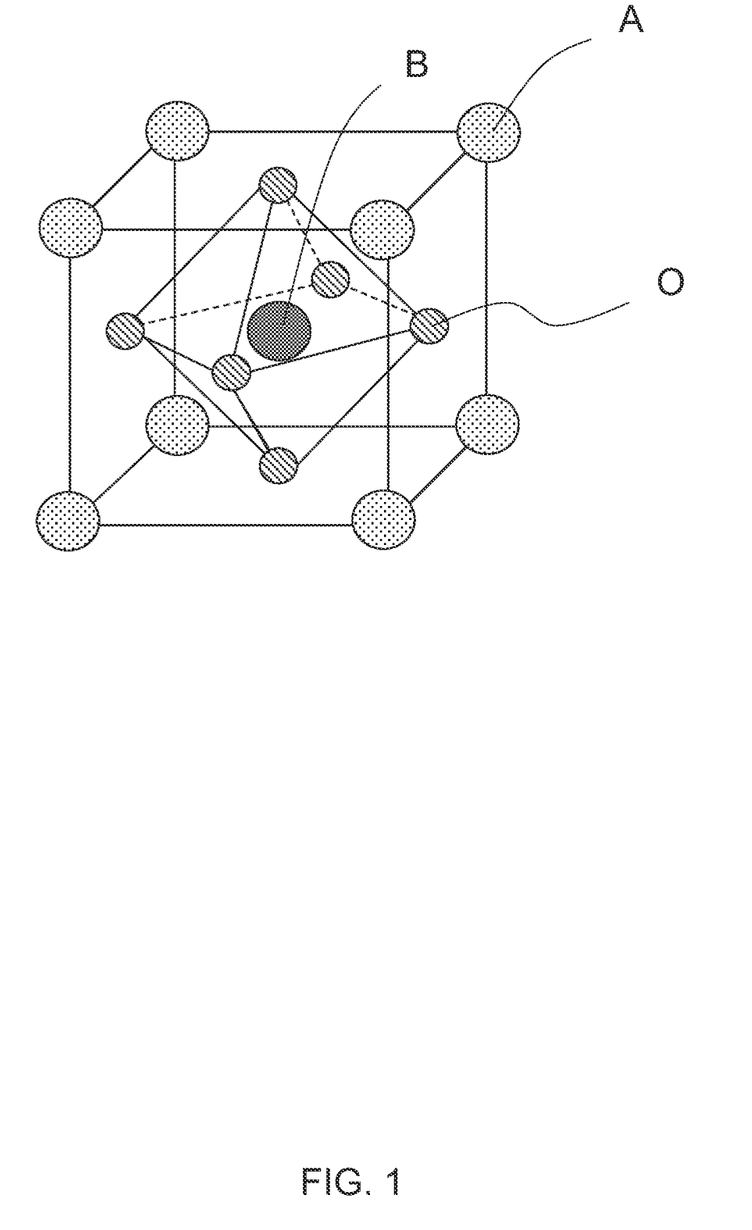
FIG. 1 is a diagram showing a generic perovskite structure expressed by the compositional formula $ABO_3$.

First, a basic structure of the perovskite structure will be briefly described with reference to FIG. 1. As illustrated in FIG. 1, the generic perovskite structure is composed of elements A, B, and O, and expressed by the compositional formula $ABO_3$. Herein, A is an element which may become a divalent cation; B is an element which may become a tetravalent cation; and O is oxygen. The unit lattice of a crystal having a perovskite structure typically has a near cubic shape. As shown in the figure, ions of element A are located on the eight vertices of the unit lattice. On the other hand, ions of oxygen O are located at the centers of the six faces of the unit lattice. Moreover, an ion of element B is located near the center of the unit lattice. The positions occupied by elements A, B, and O may be called the A site, the B site, and the O site, respectively.

The above structure is the basic structure of a perovskite crystal, in which some of elements A, B, and O may be deficient, excessive, or substituted by other elements. For example, a crystal in which element B' other than element B is located at the B site is a perovskite crystal which is expressed by the compositional formula $AB_{(1-x)}B'_xO_3$. Herein, x is a mole fraction of B', which may be referred to as the substitution ratio. When such substitution, deficiency, or excess of elements occurs, the structure of the unit lattice may distorted or deformed from being a cube. The perovskite crystal is not limited to "cubic", but broadly encompasses any crystal which has undergone a phase transition into the less-symmetric "rhombic" or "tetragonal".

(Findings of the Inventors)

In a conventional proton conducting oxide having a perovskite structure, substituting a tetravalent element B with a trivalent element B' causes oxygen deficiencies in the proton conducting oxide. This is considered because, when some of the tetravalent cations are substituted with trivalent cations, the total positive charge possessed by the cations decreases so that the mole fraction of oxygen ions, which are divalent anions, decreases due to a charge compensation action towards maintaining electrical neutrality, thereby causing oxygen deficiencies. In a proton conducting oxide having such a composition, it is considered that carriers of proton conduction are introduced into the proton conducting oxide as water molecules ($H_2O$) are introduced at the positions (O sites) of oxygen deficiencies.

Conventional proton conducting oxides are considered to exhibit proton conductivity because protons undergo hopping conduction around the oxygen atoms. In this case, temperature dependence of proton conductivity manifests itself in a thermal-activation profile, with an activation energy on the order of 0.4 to 1.0 eV. Therefore, proton conductivity undergoes an exponential decrease with decreasing temperature.

In order for the proton conducting oxide to maintain a high proton conductivity of $10^{-1}$ S/cm (Siemens/centimeter) or more even in the temperature region of not less than 100° C. and not more than 500° C., it is beneficial to ensure that the activation energy concerning proton conductivity is 0.1 eV or less, thereby suppressing any decrease in proton conductivity that is caused by decreasing temperature.

The inventors have tried to create a situation where protons can move more easily than via conventional hopping by increasing the solid solution amount (amount of substitution) of the trivalent element B' so as to increase the concentration or density of proton carriers. However, in a conventional perovskite proton conducting oxide, the upper limit of the mole fraction of the B' element is about 0.2, which presents an upper limit to the amount of oxygen deficiencies.

As a method of introducing more proton carriers, the inventors have noticed the possibility of obtaining similar effects to increasing the mole fraction of the B' element by decreasing the mole fraction of the A element. However, as is described in Solid State Ionics 110 (1998) 103-110, proton conductivity will decrease if the mole fraction a of the A element becomes smaller than 1. The presumable reason is that a component lacking proton conductivity (heterophase: a phase not having the perovskite crystal structure) is created within the texture.

Accordingly, the inventors have found that, in a realm of chemical compositions where the mole fraction a of the A element is decreased to below 1, which is conventionally considered unsuitable for proton conduction, increasing the mole fraction x of the B' element to be higher than the conventional 0.2 unexpectedly allows to lower the activation energy while maintaining a single-phase perovskite structure. As a result of this, a perovskite proton conducting oxide having high proton conductivity was obtained.

(Proton Conducting Oxide)

Hereinafter, the proton conducting oxide used for the dehydrogenation device according to an embodiment of the present disclosure will be described.

The proton conducting oxide used for the dehydrogenation device according to the embodiment of the present disclosure is a metal oxide having a perovskite crystal structure expressed by the compositional formula $A_aB_{1-x}B'_xO_{3-\delta}$. The A element is an alkaline-earth metal. The value a representing the mole fraction of the A element, which is a ratio of the number of atoms of the A element when assuming that a sum of B and B' is 1, is in the range of $0.4<a<0.9$. The B' element is a trivalent group 3 or group 13 element. The value x, which represents the mole fraction of the B element, is in the range of $0.2<x<0.6$. The mole fraction will be described in detail in the Examples described later. Note that, as described above, δ denotes oxygen deficiencies or oxygen excesses. Although the δ value has not been measured in the Examples below, it is considered that oxygen deficiencies exist so that the relationship of $0<\delta<3.0$ is satisfied.

<A Element>

An example of the A element is an alkaline-earth metal. The perovskite structure is stable. Typical examples of the A element are at least one or more kinds of elements selected from among barium (Ba), strontium (Sr), calcium (Ca), and magnesium (Mg). For example, proton conducting oxides whose A element is at least one kind selected from among barium (Ba) and strontium (Sr) can have high proton conductivity. Moreover, the A element may at least contain barium (Ba) and additionally at least one or more kinds of elements selected from among strontium (Sr), calcium (Ca), and magnesium (Mg). For example, the A element is $Ba_yA'_{1-y}(0<y\leq1)$.

The A element may be a divalent alkaline-earth metal element, in which case similar effects to increasing the mole fraction of the B' element can be obtained by decreasing the mole fraction of the A element, thus making oxygen deficiencies likely to occur; thus, an effect of enhancing the proton carrier concentration is obtained.

<B Element>

Examples of the B element are group 4 elements. Typical examples of the B element are zirconium (Zr), cerium (Ce), titanium (Ti), and hafnium (Hf). When the B element is zirconium (Zr), the perovskite structure will become stable, thus resulting in less production of any structural components not possessing proton conductivity. This is beneficial because a proton conducting oxide having high proton conductivity will be obtained.

When the B element is zirconium (Zr), titanium (Ti), or hafnium (Hf), which belong to group 4 and are tetravalent, or cerium (Ce), the perovskite structure will become stable, thus resulting in less production of any structural components not possessing proton conductivity, whereby high proton conductivity is obtained.

<B' Element>

The B' element is a group 3 element, a group 13 element, or a trivalent lanthanoid. For example, the B' element may be a group 3 element, a group 13 element, or a trivalent lanthanoid having an ion radius greater than 0.5 Å and smaller than 1.02 Å. As a result, even if the x value is greater than 0.2, a proton conducting oxide having high proton conductivity is obtained whose perovskite structure is maintained stable. It is more beneficial that a proton conducting oxide whose B' element is yttrium (Y) or indium (In) because its perovskite structure is stable and it has a high proton conductivity.

When the B' element is a trivalent group 3 element, a trivalent group 13 element, or a trivalent lanthanoid, such that the element has an ion radius value greater than 0.5 Å and smaller than 1.02 Å, oxygen deficiencies are likely to occur while maintaining a stable perovskite structure, and an effect of enhancing the proton carrier concentration is obtained, even if the x value is greater than 0.2.

(a, x, and $\delta$)

The value a, which represents the mole fraction of the A element is in the range of $0.4<a<0.9$. Oxides whose a value is smaller than 0.4 are not desirable because the perovskite structure will be unstable, and a phase not possessing proton conductivity will occur in the proton conducting oxide.

The x value representing the mole fraction of the B' element is in the range of $0.2<x<0.6$. Oxides whose a value is greater than 0.6 are not desirable because the perovskite structure will be unstable and a phase not possessing proton conductivity will occur.

Oxides such that $0.9\leq a<1.1$ and $0\leq x\leq 0.2$ are not desirable because the activation energy will be 0.1 eV or greater, thus resulting in a lower proton conductivity in a temperature range of not less than 100° C. and not more than 500° C.

Oxides such that $0.9\leq a<1.1$ and $0.2<x<0.6$ are not desirable because a phase not possessing proton conductivity will occur.

Oxides such that $a>1.1$ are not desirable because the perovskite structure will be unstable and the proton conductivity will be lowered.

Therefore, it is beneficial that $0.4<a<0.9$ and $0.2<x<0.6$ are satisfied because, in such proton conducting oxides, a stable perovskite structure will be obtained, and the proton conductivity will be $10^{-1}$ S/cm or more. Oxides such that $0.4<a<0.9$ and $0.0\leq x\leq 0.2$ are not desirable because, although having a perovskite structure, their proton conductivity will be less than $10^{-1}$ S/cm.

Furthermore, it is more beneficial that $0.4<a<0.8$ and $0.3<x<0.6$ are satisfied because, in such proton conducting oxides, they possess higher proton conductivity at 500° C. Furthermore, it is more beneficial that $0.4<a<0.8$ and $0.4<x<0.6$ are satisfied because, in such proton conducting oxides, they have high proton conductivity even at 100° C.

A is a divalent element: B is a tetravalent element: and B' is a trivalent element. O is divalent. Therefore, when the electrical neutrality condition is satisfied, it is considered that a sum of the amount of A deficiencies and a half amount of the amount of B' substitution defines the amount of oxygen deficiencies. In other words, since the amount of A deficiencies is 1-a, the amount of B' substitution is x, and the amount of oxygen deficiencies is $\delta$ per unit cell of the crystal, $\delta=(1-a)+x/2$ holds when assuming that ions of these elements satisfy the electrical neutrality condition. Therefore, when $0.4<a<0.9$ and $0.2<x<0.6$ are satisfied, $0.2<\delta<0.9$ is satisfied.

By adjusting the values of a and x to the above-mentioned ranges (a expresses a composition ratio of the element A and x expresses a composition ratio of the element B'), a proton conductor is realized which has a single-crystalline or polycrystalline perovskite structure composed of a single phase that is substantially uniform (homogeneous) in composition and crystal structure. Herein, being "composed of a single phase which is substantially uniform in composition and crystal structure" means that the proton conductor does not contain any heterophase that has a composition outside the ranges of the present invention. Note that embodiments of the proton conductor of the present disclosure may contain minute amounts of unavoidable impurities. In the case where the proton conductor of the present disclosure is produced by sintering, compounds or elements of sintering aids or the like may be partially contained. Otherwise, in the course of the production process, impurities may be added unintentionally, or intentionally for certain effects. What is important is that the respective elements of A, B, B', and O are within the ranges defined by the present disclosure, these constituting a perovskite crystal structure. Therefore, impurities which might stray in during production may be contained.

(Production Method)

The proton conducting oxide can be formed by film formation methods such as a sputtering technique, a pulsed laser deposition technique (PLD technique), or a chemical vapor deposition technique (CVD technique). There is no particular limitation as to the film forming method.

(Others)

Proton conducting oxides will also be referred to as proton conductors. An example shape of a proton conducting oxide is a film. A proton conducting oxide does not need to be a continuous film so long as it functions as a proton conducting solid electrolyte.

Moreover, the base substrate on which a film of proton conducting oxide is formed does not need to be flat. When supplying reactants (e.g., hydrogen, oxygen), it is beneficial that there is no leakage of supplied substances in order to prevent the supplied substances from directly reacting via the perovskite proton conducting oxide as a solid electrolyte. Therefore, a thin film of perovskite proton conducting oxide is formed on a base substrate having a smooth plane which is composed of magnesium oxide (MgO), strontium titanate ($SrTiO_3$), silicon (Si), or the like. Thereafter, for example, a part or a whole of the base substrate is removed by using etching or the like, thereby arriving at a proton conducting solid electrolyte. There is no particular limitation as to the material and shape of the base substrate.

The crystal structure of the proton conducting oxide may be single-crystalline or polycrystalline. A proton conducting oxide having oriented texture by controlling the orientation of crystal growth on a substrate of magnesium oxide (MgO) or strontium titanate ($SrTiO_3$), or on a silicon (Si) substrate having a buffer layer with a controlled lattice constant formed thereon, can have a higher proton conductivity. A proton conducting oxide having single-crystalline texture which is epitaxially grown on a substrate can have a higher proton conductivity. For example, single-crystalline texture can be obtained by controlling the film-formation conditions such as the surface orientation of the substrate, temperature, pressure, and the atmosphere. There is no particular limitation as to the conditions of thin film formation and the crystal system of the thin film.

Hereinafter, the present disclosure will be specifically described by way of Examples.

Example 1

A base substrate (10 mm×10 mm, thickness 0.5 mm) was set on a substrate holder within a vacuum chamber, the substrate holder having a heating mechanism, and the inside of the vacuum chamber was evacuated to a degree of vacuum of about $10^{-3}$ Pa. The material of the base substrate was single-crystalline magnesium oxide (MgO).

After the evacuation, the base substrate was heated at 650° C. to 750° C. An oxygen gas (flow rate: 2 sccm) and an argon gas (flow rate: 8 sccm) were introduced, and the pressure inside the vacuum chamber was adjusted to about 1 Pa.

By using a sintered target having an element ratio of Ba:Zr:Y=7:7:3, a proton conducting oxide was formed into a film by a sputtering technique.

The structure, mole fractions, and proton conductivity of the resultant film of proton conducting oxide were evaluated. Results are shown in Table 1 and Table 2. Hereinafter, the respective evaluation methods and the results thereof will be described. Table 1 and Table 2 also show Examples 2 to 13 and Comparative Examples 1 to 5, which will be described later.

TABLE 1

| sample | A | a | B' | x | conductivity (S/cm) 100° C. | conductivity (S/cm) 500° C. |
|---|---|---|---|---|---|---|
| Example 1 | Ba | 0.73 | Y | 0.31 | 0.36 | 0.71 |
| Example 2 | Ba | 0.48 | Y | 0.48 | 0.42 | 0.79 |
| Example 3 | Ba | 0.89 | Y | 0.58 | 0.14 | 0.55 |
| Example 4 | Ba | 0.44 | In | 0.22 | 0.32 | 0.57 |
| Example 5 | Ba | 0.71 | Y | 0.41 | 0.39 | 0.79 |
| Example 6 | Ba/Sr | 0.71 | Y | 0.27 | 0.35 | 0.66 |
| Example 7 | Ba/Sr | 0.47 | Y | 0.47 | 0.39 | 0.71 |
| Example 8 | Ba/Sr | 0.88 | Y | 0.58 | 0.15 | 0.57 |
| Example 9 | Ba/Sr | 0.43 | In | 0.21 | 0.29 | 0.55 |
| Example 10 | Ba/Sr | 0.69 | Y | 0.39 | 0.35 | 0.69 |
| Example 11 | Ba | 0.41 | Y | 0.58 | 0.45 | 0.95 |
| Example 12 | Ba | 0.88 | Y | 0.21 | 0.12 | 0.65 |
| Example 13 | Ba | 0.42 | Y | 0.22 | 0.31 | 0.54 |
| Comparative Example 1 | Ba | 0.98 | Y | 0.19 | $2.3 \times 10^{-5}$ | $3.9 \times 10^{-2}$ |
| Comparative Example 2 | Ba | 0.65 | In | 0.13 | 0.01 | $1.3 \times 10^{-2}$ |
| Comparative Example 3 | Ba | 0.35 | Y | 0.32 | $3.2 \times 10^{-6}$ | $8.5 \times 10^{-3}$ |
| Comparative Example 4 | Sr | 0.78 | Y | 0.68 | $6.5 \times 10^{-6}$ | $9.4 \times 10^{-3}$ |
| Comparative Example 5 | Sr | 1.01 | Y | 0.45 | $4.3 \times 10^{-6}$ | $8.6 \times 10^{-3}$ |

TABLE 2

| sample | activation energy (eV) | crystallinity | impurity phase |
|---|---|---|---|
| Example 1 | 0.039 | single-crystalline | — |
| Example 2 | 0.041 | single-crystalline | — |
| Example 3 | 0.091 | polycrystalline | — |
| Example 4 | 0.036 | single-crystalline | — |
| Example 5 | 0.042 | single-crystalline | — |
| Example 6 | 0.040 | polycrystalline | — |
| Example 7 | 0.035 | polycrystalline | — |
| Example 8 | 0.077 | polycrystalline | — |
| Example 9 | 0.037 | single-crystalline | — |
| Example 10 | 0.039 | single-crystalline | — |
| Example 11 | 0.043 | single-crystalline | — |
| Example 12 | 0.097 | single-crystalline | — |
| Example 13 | 0.036 | single-crystalline | — |
| Comparative Example 1 | 0.428 | single-crystalline | — |
| Comparative Example 2 | 0.015 | single-crystalline | — |
| Comparative Example 3 | 0.454 | polycrystalline | YES |
| Comparative Example 4 | 0.419 | polycrystalline | YES |
| Comparative Example 5 | 0.436 | polycrystalline | — |

By using a Cu target, X-ray diffraction of the resultant film of proton conducting oxide was measured. As shown in Table 1 and Table 2, it was confirmed that the proton conducting oxide of Example 1 had a perovskite crystal structure and was single-crystalline.

By using inductively coupled plasma spectroscopy (ICP), the mole fractions in the resultant film of proton conducting oxide were examined. As shown in Table 1 and Table 2, in the proton conducting oxide ($A_a B_{1-x} B'_x O_{3-\delta}$) of Example 1, the A element was barium (Ba) and the a value was 0.73. Moreover, the B element was zirconium (Zr); the B' element was yttrium (Y); and the x value was 0.31 (Zr:0.69, Y:0.31).

Figure 2:
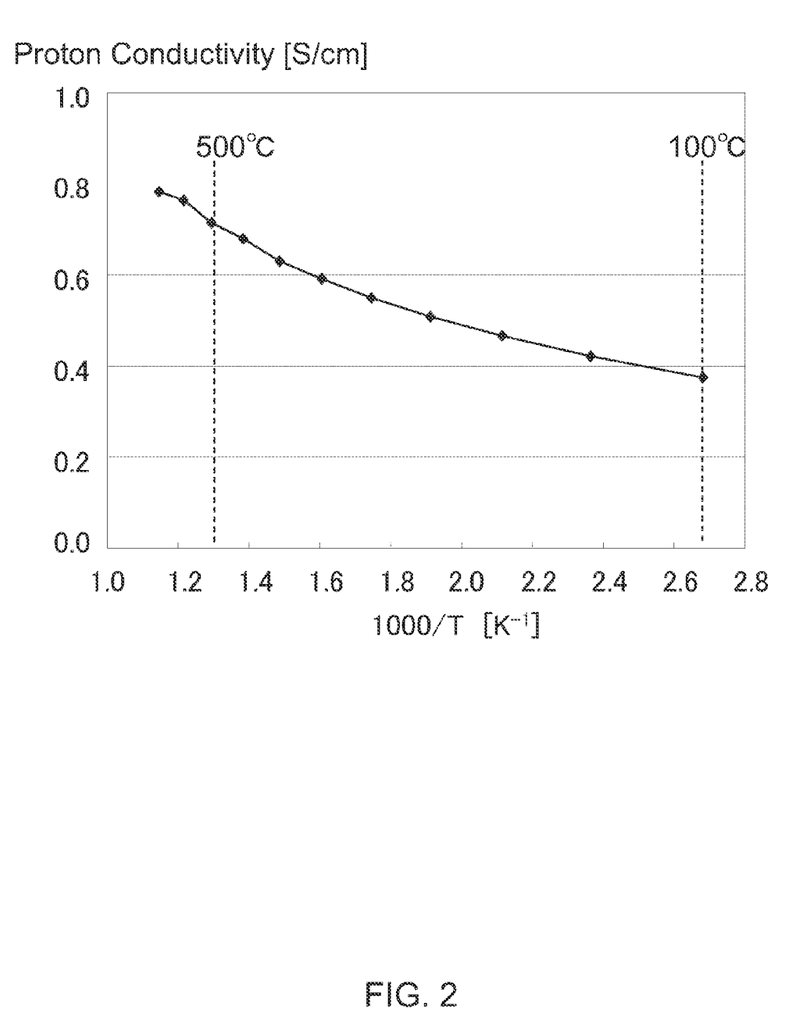
FIG. 2 is a diagram showing proton conductivity in a temperature range from 100° C. to 600° C. according to Example 1.

FIG. 2 shows measurement results of proton conductivity of the proton conducting oxide of Example 1. An electrode was formed by using silver paste on the proton conducting oxide. In an argon (Ar) gas in which 5% hydrogen ($H_2$) was mixed, under a temperature-range condition from 100° C. to 600° C., proton conductivity was measured by using an impedance method.

As shown in Table 1 and Table 2, Example 1 had a proton conductivity of 0.36 S/cm at 100° C., and a proton conductivity of 0.71 S/cm at 500° C.

Example 2

An experiment was conducted similarly to Example 1 except that a film was formed by using a sintered target having an element ratio of Ba:Zr:Y=1:1:1. Table 1 and Table 2 show the structure, mole fractions, and proton conductivity of the resultant film of proton conducting oxide.

As shown in Table 1 and Table 2, it was confirmed that the proton conducting oxide of Example 2 had a perovskite crystal structure and was single-crystalline. As shown in Table 1, in this proton conducting oxide ($A_aB_{1-x}B'_xO_{3-\delta}$), the A element was barium (Ba), and the a value was 0.48. Moreover, the B element was zirconium (Zr); the B' element was yttrium (Y); and the x value was 0.48 (Zr:0.52, Y:0.48). As shown in Table 1, Example 2 had a proton conductivity of 0.42 S/cm at 100° C., and a proton conductivity of 0.79 S/cm at 500° C.

Example 3

An experiment was conducted similarly to Example 1 except that a film was formed by using a sintered target having an element ratio of Ba:Zr:Y=9:4:6. Table 1 and Table 2 show the structure, mole fractions, and proton conductivity of the resultant film of proton conducting oxide.

As shown in Table 1 and Table 2, it was confirmed that the proton conducting oxide of Example 3 had a perovskite crystal structure and was polycrystalline. As shown in Table 1, in this proton conducting oxide ($A_aB_{1-x}B'_xO_{3-\delta}$), the A element was barium (Ba), and the a value was 0.89. Moreover, the B element was zirconium (Zr); the B' element was yttrium (Y); and the x value was 0.58 (Zr:0.42, Y:0.58). As shown in Table 1, Example 3 had a proton conductivity of 0.14 S/cm at 100° C., and a proton conductivity of 0.55 S/cm at 500° C.

Example 4

An experiment was conducted similarly to Example 1 except that a film was formed by using a sintered target having an element ratio of Ba:Zr:In=5:8:2. Table 1 and Table 2 show the structure, mole fractions, and proton conductivity of the resultant film of proton conducting oxide.

As shown in Table 1 and Table 2, it was confirmed that the proton conducting oxide of Example 4 had a perovskite crystal structure and was single-crystalline. As shown in Table 1, in this proton conducting oxide ($A_aB_{1-x}B'_xO_{3-\delta}$), the A element was barium (Ba), and the a value was 0.44. Moreover, the B element was zirconium (Zr); the B' element was indium (In); and the x value was 0.22 (Zr:0.78, In:0.22). As shown in Table 1, Example 4 had a proton conductivity of 0.32 S/cm at 100° C., and a proton conductivity of 0.57 S/cm at 500° C.

Example 5

An experiment was conducted similarly to Example 1 except that a film was formed by using a sintered target having an element ratio of Ba:Zr:Y=8:6:4. Table 1 and Table 2 show the structure, mole fractions, and proton conductivity of the resultant film of proton conducting oxide.

As shown in Table 1 and Table 2, it was confirmed that the proton conducting oxide of Example 5 had a perovskite crystal structure and was single-crystalline. As shown in Table 1, in this proton conducting oxide ($A_aB_{1-x}B'_xO_{3-\delta}$), the A element was barium (Ba), and the a value was 0.71. Moreover, the B element was zirconium (Zr); the B' element was yttrium (Y); and the x value was 0.41 (Zr:0.59, Y:0.41). As shown in Table 1, Example 5 had a proton conductivity of 0.39 S/cm at 100° C., and a proton conductivity of 0.79 S/cm at 500° C.

Example 6

An experiment was conducted similarly to Example 1 except that the material of the base substrate was single-crystalline strontium titanate ($SrTiO_3$), and that the film was formed by using a sintered target having an element ratio of Ba:Sr:Zr:Y=3:4:7:3. Table 1 and Table 2 show the structure, mole fractions, and proton conductivity of the resultant film of proton conducting oxide.

As shown in Table 1 and Table 2, it was confirmed that the proton conducting oxide of Example 6 had a perovskite crystal structure and was polycrystalline. As shown in Table 1, in this proton conducting oxide ($A_aB_{1-x}B'_xO_{3-\delta}$), the A element was barium (Ba) and strontium (Sr). The barium (Ba) and strontium (Sr) had a ratio such that barium (Ba) was 0.22 and strontium (Sr) was 0.49, and the a value was 0.71. Moreover, the B element was zirconium (Zr); the B' element was yttrium (Y); and the x value was 0.27 (Zr:0.73, Y:0.27). As shown in Table 1, Example 6 had a proton conductivity of 0.35 S/cm at 100° C., and a proton conductivity of 0.66 S/cm at 500° C.

Example 7

An experiment was conducted similarly to Example 6 except that a film was formed by using a sintered target having an element ratio of Ba:Sr:Zr:Y=1:1:2:2. Table 1 and Table 2 show the structure, mole fractions, and proton conductivity of the resultant film of proton conducting oxide.

As shown in Table 1 and Table 2, it was confirmed that the proton conducting oxide of Example 7 had a perovskite crystal structure and was polycrystalline. As shown in Table 1, in this proton conducting oxide ($A_aB_{1-x}B'_xO_{3-\delta}$), the A element was barium (Ba) and strontium (Sr). The barium (Ba) and strontium (Sr) had a ratio such that barium (Ba) was 0.22 and strontium (Sr) was 0.25, and the a value was 0.47. Moreover, the B element was zirconium (Zr); the B' element was yttrium (Y); and the x value was 0.47 (Zr:0.53, Y:0.47). As shown in Table 1 and Table 2, Example 7 had a proton conductivity of 0.39 S/cm at 100° C., and a proton conductivity of 0.71 S/cm at 500° C.

Example 8

An experiment was conducted similarly to Example 6 except that a film was formed by using a sintered target having an element ratio of Ba:Sr:Zr:Y=2:7:4:6. Table 1 and Table 2 show the structure, mole fractions, and proton conductivity of the resultant film of proton conducting oxide.

As shown in Table 1 and Table 2, it was confirmed that the proton conducting oxide of Example 8 had a perovskite crystal structure and was polycrystalline. As shown in Table 1, in this proton conducting oxide ($A_aB_{1-x}B'_xO_{3-\delta}$), the A element was barium (Ba) and strontium (Sr). The barium (Ba) and strontium (Sr) had a ratio such that barium (Ba) was 0.20 and strontium (Sr) was 0.68, and the a value was 0.88. Moreover, the B element was zirconium (Zr); the B' element was yttrium (Y); and the x value was 0.58 (Zr:0.42, Y:0.58). As shown in Table 1 and Table 2, Example 8 had a proton conductivity of 0.15 S/cm at 100° C., and a proton conductivity of 0.57 S/cm at 500° C.

Example 9

An experiment was conducted similarly to Example 6 except that a film was formed by using a sintered target having an element ratio of Ba:Sr:Zr:In=4:1:8:2. Table 1 shows the structure, pole fractions, and proton conductivity of the resultant film of proton conducting oxide.

As shown in Table 1 and Table 2, it was confirmed that the proton conducting oxide of Example 9 had a perovskite crystal structure and was single-crystalline. As shown in Table 1, in this proton conducting oxide ($A_aB_{1-x}B'_xO_{3-\delta}$), the A element was barium (Ba) and strontium (Sr). The barium (Ba) and strontium (Sr) had a ratio such that barium (Ba) was 0.35 and strontium (Sr) was 0.08, and the a value was 0.43. Moreover, the B element was zirconium (Zr); the B' element was indium (In); and the x value was 0.21 (Zr:0.79, In:0.21). As shown in Table 1 and Table 2, Example 9 had a proton conductivity of 0.29 S/cm at 100° C., and a proton conductivity of 0.55 S/cm at 500° C.

Example 10

An experiment was conducted similarly to Example 6 except that a film was formed by using a sintered target having an element ratio of Ba:Sr:Zr:Y=5:2:6:4. Table 1 and Table 2 show the structure, mole fractions, and proton conductivity of the resultant film of proton conducting oxide.

As shown in Table 1 and Table 2, it was confirmed that the proton conducting oxide of Example 10 had a perovskite crystal structure and was single-crystalline. As shown in Table 1, in this proton conducting oxide ($A_aB_{1-x}B'_xO_{3-\delta}$), the A element was barium (Ba) and strontium (Sr). The barium (Ba) and strontium (Sr) had a ratio such that barium (Ba) was 0.48 and strontium (Sr) was 0.21, and the a value was 0.69. Moreover, the B element was zirconium (Zr); the B' element was yttrium (Y); and the x value was 0.39 (Zr:0.61, Y:0.39). As shown in Table 1, Example 10 had a proton conductivity of 0.35 S/cm at 100° C., and a proton conductivity of 0.69 S/cm at 500° C.

Example 11

An experiment was conducted similarly to Example 1 except that a film was formed by using a sintered target having an element ratio of Ba:Zr:Y=2:2:3. Table 1 and Table 2 show the structure, mole fractions, and proton conductivity of the resultant film of proton conducting oxide.

As shown in Table 1 and Table 2, it was confirmed that the proton conducting oxide of Example 11 had a perovskite crystal structure and was single-crystalline. As shown in Table 1, in this proton conducting oxide ($A_aB_{1-x}B'_xO_{3-\delta}$), the A element was barium (Ba), and the a value was 0.41. Moreover, the B element was zirconium (Zr); the B' element was yttrium (Y); and the x value was 0.58 (Zr:0.42, Y:0.58). As shown in Table 1, Example 11 had a proton conductivity of 0.45 S/cm at 100° C., and a proton conductivity of 0.95 S/cm at 500° C.

Example 12

An experiment was conducted similarly to Example 1 except that a film was formed by using a sintered target having an element ratio of Ba:Zr:Y=9:8:2. Table 1 and Table 2 show the structure, mole fractions, and proton conductivity of the resultant film of proton conducting oxide.

As shown in Table 1 and Table 2, it was confirmed that the proton conducting oxide of Example 12 had a perovskite crystal structure and was single-crystalline. As shown in Table 1, in this proton conducting oxide ($A_aB_{1-x}B'_xO_{3-\delta}$), the A element was barium (Ba), and the a value was 0.88. Moreover, the B element was zirconium (Zr); the B' element was yttrium (Y); and the x value was 0.21 (Zr:0.79, Y:0.21).

As shown in Table 1, Example 12 had a proton conductivity of 0.12 S/cm at 100° C., and a proton conductivity of 0.65 S/cm at 500° C.

Example 13

An experiment was conducted similarly to Example 1 except that a film was formed by using a sintered target having an element ratio of Ba:Zr:Y=3:4:1. Table 1 and Table 2 show the structure, mole fractions, and proton conductivity of the resultant film of proton conducting oxide.

As shown in Table 1 and Table 2, it was confirmed that the proton conducting oxide of Example 13 had a perovskite crystal structure and was single-crystalline. As shown in Table 1, in this proton conducting oxide ($A_aB_{1-x}B'_xO_{3-\delta}$), the A element was barium (Ba), and the a value was 0.42. Moreover, the B element was zirconium (Zr); the B' element was yttrium (Y); and the x value was 0.22 (Zr:0.78, Y:0.22). As shown in Table 1, Example 13 had a proton conductivity of 0.31 S/cm at 100° C., and a proton conductivity of 0.54 S/cm at 500° C.

Comparative Example 1

An experiment was conducted similarly to Example 1 except that a film was formed by using a sintered target having an element ratio of Ba:Zr:Y=5:4:1. Table 1 and Table 2 show the structure, mole fractions, and proton conductivity of the resultant film of proton conducting oxide.

As shown in Table 1 and Table 2, it was confirmed that the proton conducting oxide of Comparative Example 1 had a perovskite crystal structure and was single-crystalline. As shown in Table 1 and Table 2, in this oxide ($A_aB_{1-x}B'_xO_{3-\delta}$), the A element was barium (Ba), and the a value was 0.98. Moreover, the B element was zirconium (Zr); the B' element was yttrium (Y); and the x value was 0.19 (Zr:0.81, Y:0.19).

As shown in Table 1 and Table 2, Comparative Example 1 had a proton conductivity of $2.3 \times 10^{-5}$ S/cm at 100° C., and a proton conductivity of 0.039 S/cm at 500° C.

Comparative Example 2

An experiment was conducted similarly to Example 1 except that a film was formed by using a sintered target having an element ratio of Ba:Zn:In=7:91. Table 1 and Table 2 show the structure, mole fractions, and proton conductivity of the resultant film of proton conducting oxide.

As shown in Table 1 and Table 2, it was confirmed that the proton conducting oxide of Comparative Example 2 had a perovskite crystal structure and was single-crystalline. As shown in Table 1 and Table 2, in this oxide ($A_aB_{1-x}B'_xO_{3-\delta}$), the A element was barium (Ba), and the a value was 0.65. Moreover, the B element was zirconium (Zr); the B' element was indium (In); and the x value was 0.13 (Zr:0.87, In:0.13). As shown in Table 1, Comparative Example 2 had a proton conductivity of 0.01 S/cm at 100° C., and a proton conductivity of 0.013 S/cm at 500° C.

Comparative Example 3

An experiment was conducted similarly to Example 1 except that a film was formed by using a sintered target having an element ratio of Ba:Zr:Y=4:7:3. Table 1 and Table 2 show the structure, mole fractions, and proton conductivity of the resultant film of proton conducting oxide.

As shown in Table 1 and Table 2, the proton conducting oxide of Comparative Example 3 contained a polycrystalline perovskite crystal structure. Moreover, zirconium dioxide ($ZrO_2$) was detected as an impurity phase. As shown in Table 1, in this oxide ($A_aB_{1-x}B'_xO_{3-\delta}$), the A element was barium (Ba), and the a value was 0.35. Moreover, the B element was zirconium (Zr); the B' element was yttrium (Y); and the x value was 0.32 (Zr:0.68, Y:0.32). As shown in Table 1, Comparative Example 3 had a proton conductivity of $3.2\times 10^{-6}$ S/cm at 100° C., and a proton conductivity of $8.5\times 10^{-3}$ S/cm at 500° C.

Comparative Example 4

An experiment was conducted similarly to Example 1 except that the material of the base substrate was single-crystalline strontium titanate ($SrTiO_3$), and that the film was formed by using a sintered target having an element ratio of Sr:Zr:Y=8:3:7. Table 1 and Table 2 show the structure, mole fractions, and proton conductivity of the resultant film of proton conducting oxide.

As shown in Table 1 and Table 2, the proton conducting oxide of Comparative Example 4 contained a polycrystalline perovskite crystal structure. Moreover, barium carbonate ($BaCO_3$) and yttrium oxide ($Y_2O_3$) were also detected as an impurity phase. As shown in Table 1 and Table 2, in this oxide ($A_aB_{1-x}B'_xO_{3-\delta}$), the A element was strontium (Sr), and the a value was 0.78. Moreover, the B element was zirconium (Zr); the B' element was yttrium (Y); and the x value was 0.68 (Zr:0.32, Y:0.68).

As shown in Table 1 and Table 2, Comparative Example 4 had a proton conductivity of $6.5\times 10^{-6}$ S/cm at 100° C., and a proton conductivity of $9.4\times 10^{-3}$ S/cm at 500° C.

Comparative Example 5

An experiment was conducted similarly to Comparative Example 4 except that a film was formed by using a sintered target having an element ratio of Sr:Zr:Y=5:3:2. Table 1 shows the structure, mole fractions, and proton conductivity of the resultant film of proton conducting oxide.

As shown in Table 1 and Table 2, it was confirmed that the proton conducting oxide of Comparative Example 5 had a perovskite crystal structure and was polycrystalline. As shown in Table 1 and Table 2, in this oxide ($A_aB_{1-x}B'_xO_{3-\delta}$), the A element was strontium (Sr), and the a value was 1.01. Moreover, the B element was zirconium (Zr); the B' element was yttrium (Y); and the x value was 0.45 (Zr:0.55, Y:0.45).

As shown in Table 1 and Table 2, Comparative Example 5 had a proton conductivity of $4.3\times 10^{-6}$ S/cm at 100° C., and a proton conductivity of $8.6\times 10^{-3}$ S/cm at 500° C.

As shown in Table 1 and Table 2, it can be seen that the proton conducting oxides of Examples 1 to 13 had high proton conductivity as compared to Comparative Examples 1 to 5. The proton conducting oxides of Examples 1 to 13 satisfy the conditions of $0.4<a<0.9$ and $0.2<x<0.6$.

A manufacturing error of at least about 5% is known to exist. From the a and x values of Examples 1 to 13, proton conducting oxides satisfying $0.4<a<0.9$ and $0.2<x<0.6$ have high proton conductivity.

More specifically, the proton conductor oxides of Example 3, Example 9, Example 11, and Example 12 fall within numerical ranges bounded by the four equations of x=0.21, x=0.58, a=−0.054x+0.441, and a=−0.027x+0.886. That is, in these Examples, the mole fractions x and a satisfy the following relationship.

$0.21 \leq x \leq 0.58$, $a \geq -0.054x + 0.441$, and $a \leq -0.027x + 0.886$

In the proton conducting oxides of Examples 1 to 13, the activation energies at 100° C. and 500° C. were lower than 0.1 eV. On the other hand, the oxides of Comparative Examples 1 and 3 to 5 had activation energies higher than 0.1 eV. In other words, when the mole fractions satisfy the above conditions (Examples), the proton conducting oxides maintain high proton conductivity of $10^{-1}$ S/cm or more, even in a temperature region of not less than 100° C. and not more than 500° C. Thus, according to the present disclosure, the activation energy of proton conduction can be kept at 0.1 eV or less, whereby a decrease in proton conductivity due to decreasing temperature can be suppressed. Furthermore, proton conducting oxides satisfying the conditions of $0.4<a<0.9$ and $0.2<x<0.6$ have higher proton conductivity than does the oxide of Comparative Example 2, which has an activation energy of proton conduction of 0.1 eV or less.

From the experiment of the inventors, it has been found that production is facilitated when (1-a), which represents the amount of deficiencies of the A element, is close to the mole fraction x of the B' element. Therefore, it is practically useful if the following relationship is satisfied.

$0.5 < (1-a)/x < 2.5$

Moreover, as is clear from Table 1 and Table 2, relatively high proton conductivity is realized when $0.4<a<0.6$ and $0.4<x<0.6$, and the highest high proton conductivity is realized when $0.4<a<0.5$ and $0.4<x<0.6$.

Furthermore, the proton conducting oxides of Examples 1, 2, 5, 7, 10, and 11 have higher proton conductivity at 500° C. With a manufacturing error of at least about 5% taken into consideration, the proton conducting oxides of Examples 1, 2, 5, 7, 10, and 11 satisfy the conditions of $0.4<a<0.8$ and $0.3<x<0.6$. More specifically, the proton conducting oxides of Example 1, 2, 5, 7, 10, and 11 satisfy conditions defined by the numerical ranges of $0.41<a<0.73$ and $0.31<x<0.58$ plus the manufacturing error.

Furthermore, the proton conducting oxides of Example 2, 5, 7, and 11 have high proton conductivity at 100° C. With a manufacturing error of at least about 5% taken into consideration, the proton conducting oxides of Example 2, 5, 7, and 11 satisfy the conditions of $0.4<a<0.8$ and $0.4<x<0.6$. More specifically, the proton conducting oxides of Example 2, 5, 7, and 11 satisfy conditions defined by the numerical ranges of $0.41<a<0.71$ and $0.41<x<0.58$ plus the manufacturing error.

(Embodiment of Dehydrogenation Device)

Hereinafter, the structure and operation of the dehydrogenation device according to the embodiment of the present disclosure will be described with reference to FIG. 3.

Figure 3:
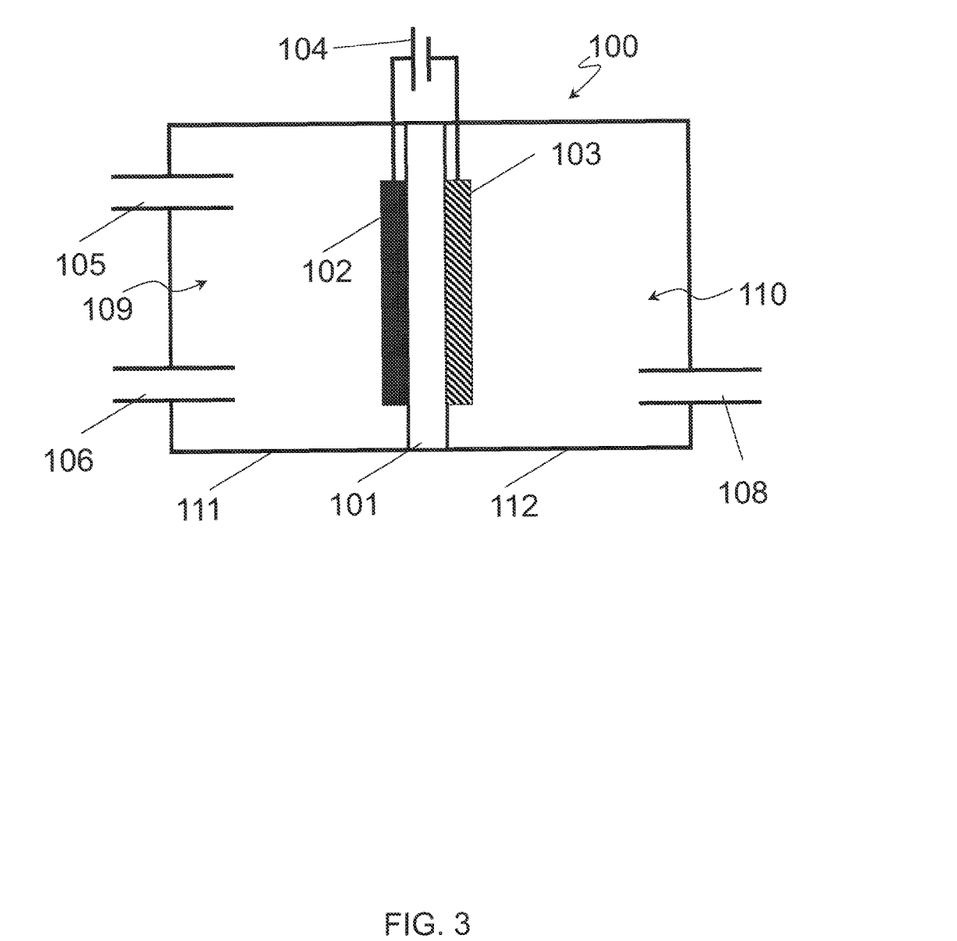
FIG. 3 is a cross-sectional view showing an exemplary dehydrogenation device according to an embodiment of the present disclosure.

A dehydrogenation device 100 shown in FIG. 3 comprises an anode 102, a cathode 103, and a proton conductor 101 disposed between the anode 102 and the cathode 103. The proton conducting oxide described with reference to the examples may be used as the proton conductor 101. The proton conductor 101 has high proton conductivity even in the temperature range of not less than 100 degrees Celsius and not more than 500 degrees Celsius. For this reason, the dehydrogenation device 100 can operate in the temperature range of not less than 100 degrees Celsius and not more than 500 degrees Celsius. Besides, in the dehydrogenation device 100 comprising the proton conductor 101, it is not necessary to supply water positively from the anode 102 or the cathode 103 to the electrolyte (i.e., the proton conductor 101), unlike the case where the proton conductive solid polymer membrane is used as an electrolyte.

As exemplified in FIG. 3, the anode 102 and the cathode 103 are disposed typically so as to interpose the proton conductor 101 therebetween. In FIG. 3, the anode 102 is disposed on the front surface of the proton conductor 101, whereas the cathode 103 is disposed on the back surface of the proton conductor 101. The positional relation of the proton conductor 101, the anode 102 and the cathode 103 is not limited to that of FIG. 3 and various positions may be employed. For example, the anode 102 and the cathode 103 may be disposed on the same surface of the proton conductor 101.

In the operation of the dehydrogenation device 100, as shown in FIG. 3, the anode 102 is connected to one end of an external power supply 104, and the cathode 103 is connected to the other end of the external power supply 104. The electric power supplied from the external power supply 104 may be electric power supplied from a commercial system, supplied from a battery such as a chemical battery or a fuel cell, or supplied from a capacitor. As shown in FIG. 3 schematically, the anode 102 has higher potential than the cathode 103 in the operation of the dehydrogenation device 100.

The anode 102 includes the dehydrogenation catalyst. In other words, the anode 102 is configured to withdraw protons from a gas or a liquid containing the organic hydride. An example of the catalyst included in the anode 102 is a metal including at least one selected from the group consisting of Ni, Pt, Pd, and an alloy thereof. Another example of the catalyst included in the anode 102 is an oxide including at least one selected from the group consisting of Ni, Pt, and Pd.

When a metal including at least one selected from the group consisting of Ni, Pt, Pd, and an alloy thereof is used as the catalyst included in the anode 102, the catalyst may be supported on the surface of the support formed of $Al_2O_3$, $SiO_2$, or $ZrO_2$. In other words, the anode 102 may further include the support. The material of the support is not limited. The anode 102 can be easily formed on the support formed of $Al_2O_3$, $SiO_2$, or $ZrO_2$. The shape of the support is not limited, as long as the catalyst included in the anode 102 is electrically connected to the external power supply 104. When the anode 102 includes the support, the catalyst can be dispersed on the support having a large surface area.

The anode 102 is formed by a film formation method such as a sputtering method, a pulse laser deposition method (hereinafter, referred to as "PLD method"), or a chemical vapor deposition method (hereinafter, referred to as "CVD method"). After an ink in which a powder formed of the above-mentioned material is dispersed in a solvent is applied by a screen printing method, the ink may be dried and solidified through heat and vacuum treatment to give the anode 102. The method for forming the anode 102 is not limited.

The cathode 103 includes a catalyst capable of reducing protons. In other words, the cathode 103 is configured to generate a hydrogen gas by reducing protons which have been transferred from the anode 102 to the cathode 103 through the proton conductor 101. Since the cathode 103 is exposed to the generated hydrogen gas, it is beneficial that the catalyst included in the cathode 103 is a catalyst including a metal or alloy capable of securing electrical conductivity even when reduced. An example of the catalyst included in the cathode 103 is a metal including at least one selected from the group consisting of Ni, Pt, Re, Rh, and an alloy thereof. Another example of the catalyst included in the cathode 103 is an oxide including at least one selected from the group consisting of Ni, Pt, Re, and Rh. A cermet may be used as the catalyst included in the cathode 103. For example, a cermet containing an oxide including at least one selected from the group consisting of Ni, Pt, Re, and Rh may be used. From a viewpoint of easiness and costs of the formation of the cathode 103, it is beneficial that a cermet containing an oxide including Ni is used.

The cathode 103 may be formed by a film formation method such as a sputtering method, a PLD method, or a CVD method. After an ink in which a powder formed of the above-mentioned material is dispersed in a solvent is applied by a screen printing method, the ink may be dried and solidified through heat and vacuum treatment to give the cathode 103. The method for forming the cathode 103 is not limited.

The dehydrogenation device 100 shown in FIG. 3 has an anode-side reaction container 111 comprising a first fluid inlet 105 and a first fluid outlet 106 and a cathode-side reaction container 112 comprising a second fluid outlet 108. A partition wall separates the space in the anode-side reaction container 111 and the space in the cathode-side reaction container 112 from each other. The proton conductor 101 of the dehydrogenation device 100 shown in FIG. 3 serves as the partition wall which separates these two spaces from each other.

As shown in FIG. 3, a first flow path 109 is provided in the anode-side reaction container 111. A fluid supplied from the first fluid inlet 105 flows through the first flow path 109 to the first fluid outlet 106. A second flow path 110 is provided in the cathode-side reaction container 112. Each of the first flow path 109 and the second flow path 110 is airproof and waterproof. The fluids which flow through the first flow path 109 and the second flow path 110 are not mixed with each other. As shown in FIG. 3, at least a part of the surface of the anode 102 is exposed on the first flow path 109, and at least a part of the surface of the cathode 103 is exposed on the second flow path 110.

As shown in FIG. 3, when the dehydrogenation device 100 operates, a gas or liquid containing the organic hydride is supplied through the first fluid inlet 105 to the first flow path 109. A mixture of two kinds or more of the organic hydrides may be used. As described later in more detail, the dehydrogenation device 100 operates to generate a hydrogen gas in the second flow path 110. The generated hydrogen gas is collected through the second fluid outlet 108. In order to supply the gas or the liquid containing the organic hydride, a pipe (not shown) is connected to each of the first fluid inlet 105 and the first fluid outlet 106. A tank, a tank, a valve, a compressor, a mass flow controller may be provided with the pipe. In order to collect the generated hydrogen gas, a pipe (not shown) is connected to the second fluid outlet 108. A cylinder, a tank, a valve, a compressor, or a mass flow controller may be provided to the pipe which is connected to the second fluid outlet 108.

In the dehydrogenation device 100, the liquid or the gas containing the organic hydride is supplied to the anode 102. By applying a voltage difference between the anode 102 and the cathode 103, the organic hydride is dehydrogenated on the anode 102. Protons withdrawn from the organic hydride are electrochemically transferred to the cathode 103 through the proton conductor 101 by the action of the above-mentioned hydrogen pump. Protons which have reached the cathode 103 are reduced on the cathode 103. In this way, the hydrogen gas is generated in the second flow path 110. The hydrogen gas generated in the second flow path 110 is a substantially pure hydrogen gas. As just described, the hydrogen gas having a high purity is obtained from the organic hydride using the dehydrogenation device 100.

For example, a liquid organic hydride (e.g., methylcyclohexane) is supplied from the first fluid inlet 105, and the organic hydride is brought into contact with the anode 102 in the first flow path 109. An organic hydride in the form of mist may be sprayed on the anode 102. A gas containing an organic hydride in the form of a gas or vapor may be supplied to the anode 102. The gas supplied to the anode 102 may contain, for example, water vapor, a hydrocarbon gas, a nitrogen gas, a carbon dioxide gas, an oxygen gas, an argon gas, or a helium gas. Protons are withdrawn from the organic hydride (e.g., methylcyclohexane).

The reaction shown in the following chemical reaction formula (1) progresses on the anode 102.

$$C_7H_{14} \rightarrow C_7H_8 + 6H^+ + 6e^- \qquad (1)$$

The dehydrogenation product (e.g., toluene) of the organic hydride (e.g., methylcyclohexane) is discharged through the first fluid outlet 106. The dehydrogenation product discharged through the first fluid outlet 106 may be reused as the organic hydride after the hydrogenation thereof. The dehydrogenation product discharged through the first fluid outlet 106 may contain the organic hydride. The organic hydride discharged through the first fluid outlet 106 may be collected and supplied again from the first fluid inlet 105 to the first flow path 109.

The dehydrogenation device 100 is operated under a temperature of approximately 200 degrees Celsius. For this reaction, the organic hydride and/or the dehydrogenation product thereof can be prevented from being deformed.

The protons generated on the anode 102 are transferred through the proton conductor 101 and reach the cathode 103. The proton conductor 101 prevents the anode 102 and the cathode 103 from being short-circuited. The proton conductor 101 also supplies the protons generated on the anode 102 to the cathode 103. In the operation of the dehydrogenation device 100, the external power supply 104 applies a voltage between the anode 102 and the cathode 103. The protons generated on the anode 102 are electrochemically transferred through the proton conductor 101 to the cathode 103.

Protons are withdrawn on the anode 102 from the gas containing the organic hydride. Then, the protons are transferred through the proton conductor 101 and reduced to hydrogen on the cathode 103. The reaction shown in the following chemical reaction formula (2) progresses on the cathode 103.

$$6H^+ + 6e^- \rightarrow 3H_2 \qquad (2)$$

The hydrogen gas is generated in the second flow path 110 through the above-mentioned reaction. As is clear from the above-mentioned reaction formula, no water is generated on the cathode 103. Unlike the case where a solid polymer membrane is used as a proton conductive solid electrolyte, the electrolyte does not have to be maintained under the wet condition. For this reason, a dried hydrogen gas is obtained.

The flow path for supplying the gas or liquid containing the organic hydride and the flow path for collecting the generated hydrogen gas are not limited to those shown in FIG. 3. Various constitutions and positions thereof may be employed. For example, the positions of the first fluid inlet 105 and the first fluid outlet 106 are designed in light of the specific weight of the organic hydride and the dehydrogenation products thereof. When the anode 102, the proton conductor 101, and the cathode 103 are stacked in this order, it is only necessary that at least a part of the partition wall which separates the anode-side space and the cathode side-space from each other is a stacked structure of the anode 102, the proton conductor 101, and the cathode 103.

As just described, the embodiments according to the present disclosure provide a practical dehydrogenation device operable even in the temperature range of not less than 100 degrees Celsius and not more than 300 degrees Celsius. The organic hydride is dehydrogenated in the temperature range of not more than 300 degrees Celsius using the dehydrogenation device according to the present disclosure. For this reason, a hydrogen gas is obtained while the organic hydride and/or the dehydrogenation products thereof are prevented from being deformed. In addition, the range of the choice of the materials of the reaction container or pipe is widened. Since no water is generated on the cathode and it is unnecessary to maintain the electrolyte under the wet condition in the embodiment according to the present disclosure, a dry hydrogen gas having high purity is obtained, although the dehydrogenation device has a simple structure. Since the dehydrogenation device according to the embodiment of the present disclosure can control the transfer of the protons included in the proton conductor electrically, a hydrogen generation amount can be controlled accurately.

INDUSTRIAL APPLICABILITY

The dehydrogenation device according to the embodiment of the present disclosure can be used for the fabrication of hydrogen. In the embodiment of the present disclosure, hydrogen stored in the form of the organic hydride can be picked up in the form of a hydrogen gas when needed.

REFERENCE SIGNS LIST 100 dehydrogenation device
101 proton conductor
102 anode
103 cathode
104 external power supply
105 first fluid inlet
106 first fluid outlet
108 second fluid outlet
109 first flow path
110 second flow path
111 anode-side reaction container
112 cathode-side reaction container

The invention claimed is:

1. A dehydrogenation device for generating a hydrogen gas through dehydrogenation, comprising:
   an anode containing a dehydrogenation catalyst;
   a cathode containing a catalyst capable of reducing protons; and
   a proton conductor disposed between the anode and the cathode,
   wherein
   the proton conductor has a perovskite crystal structure expressed by the compositional formula $A_aB_{1-x}B'_xO_{3-\delta}$;
   where
   A is at least one selected from among alkaline-earth metals;
   B is a tetravalent group 4 transition metal or Ce;
   B' is a trivalent group 3 or group 13 element; and
   $0.4 < a < 0.9$ and $0.2 < x < 0.6$ are satisfied.

2. The dehydrogenation device according to claim 1, wherein
   A is at least one selected from among Ba and Sr;
   B is Zr; and
   B' is Y or In.

3. The dehydrogenation device according to claim 1, wherein
the value of a satisfies 0.4<a<0.8; and
the value of x satisfies 0.3<x<0.6.

4. The dehydrogenation device according to claim 3, wherein
the value of a satisfies 0.4<a<0.8; and
the value of x satisfies 0.4<x<0.6.

5. The dehydrogenation device according to claim 4, wherein
the value of a satisfies 0.4<a<0.6; and
the value of x satisfies 0.4<x<0.6.

6. The dehydrogenation device according to claim 5, wherein
the value of a satisfies 0.4<a<0.5; and
the value of x satisfies 0.4<x<0.6.

7. The dehydrogenation device according to claim 1, wherein
an activation energy of proton conduction of the proton conductor in a temperature range of not less than 100 degrees Celsius and not more than 500 degrees Celsius is 0.1 eV or less.

8. The dehydrogenation device according to claim 1, wherein
the following relationship is satisfied:

$0.21 \leq x \leq 0.58$;

$a \geq -0.054x + 0.441$; and $a \leq -0.027x + 0.886$.

9. The dehydrogenation device according to claim 1, wherein
the proton conductor is composed of a single phase which is substantially uniform in composition and crystal structure.

10. The dehydrogenation device according to claim 1, wherein
the dehydrogenation catalyst is a metal containing at least one selected from the group consisting of Ni, Pt, Pd, and an alloy thereof.

11. The dehydrogenation device according to claim 1, wherein
the dehydrogenation catalyst is an oxide containing at least one selected from the group consisting of Ni, Pt, and Pd.

12. The dehydrogenation device according to claim 1, wherein
the anode further comprises a support;
the support is formed of $Al_2O_3$, $SiO_2$, or $ZrO_2$;
the dehydrogenation catalyst is a metal containing at least one selected from the group consisting of Ni, Pt, Pd, and an alloy thereof; and
the dehydrogenation catalyst is supported on a surface of the support.

13. The dehydrogenation device according to claim 1, wherein
the catalyst capable of reducing protons is a metal containing at least one selected from the group consisting of Ni, Pt, Re, Rh, and an alloy thereof.

14. The dehydrogenation device according to claim 1, wherein
the catalyst capable of reducing protons is an oxide containing at least one selected from the group consisting of Ni, Pt, Re, and Rh.

15. The dehydrogenation device according to claim 1, wherein
the catalyst capable of reducing protons is a cermet containing an oxide including at least one selected from the group consisting of Ni, Pt, Re, and Rh.

16. A method for generating a hydrogen gas through dehydrogenation of an organic hydride, the method comprising:

(a) preparing a dehydrogenation device for generating the hydrogen gas through the dehydrogenation, comprising:
an anode containing a dehydrogenation catalyst;
a cathode containing a catalyst capable of reducing protons; and
a proton conductor disposed between the anode and the cathode,
wherein
the proton conductor has a perovskite crystal structure expressed by the compositional formula $A_aB_{1-x}B'_xO_{3-\delta}$; where
A is at least one selected from among alkaline-earth metals;
B is a tetravalent group 4 transition metal or Ce;
B' is a trivalent group 3 or group 13 element; and
0.4<a<0.9 and 0.2<x<0.6 are satisfied,
the dehydrogenation device further comprises an anode-side reaction container in which the anode is placed and a cathode-side reaction container in which the cathode is placed;
the anode-side reaction container and the cathode-side reaction container are separated from each other by the proton conductor; and (b) generating the hydrogen gas in the cathode-side reaction container through the dehydrogenation of the organic hydride by bringing the organic hydride into contact with the anode, while the anode-side reaction container has a higher pressure than the cathode reaction container.

* * * * *